US012807531B2

(12) United States Patent
Zalewski et al.

(10) Patent No.: US 12,807,531 B2
(45) Date of Patent: Nov. 24, 2026

(54) METHOD FOR MANUFACTURING A SUPPLEMENTARY CEMENTITIOUS MATERIAL

(71) Applicant: HSustainability GmbH, Heidelberg (DE)

(72) Inventors: Jacek Zalewski, Heidelberg (DE); Artur Golda, Heidelberg (DE); Maciej Batog, Heidelberg (DE); Damian Dziuk, Heidelberg (DE); Katarzyna Synowiec, Heidelberg (DE); Karol Zaczek, Heidelberg (DE); Marcin Palczewski, Heidelberg (DE)

(73) Assignee: HSustainability GmbH, Heidelberg (DE)

( * ) Notice: Subject to any disclaimer, the term of this patent is extended or adjusted under 35 U.S.C. 154(b) by 384 days.

(21) Appl. No.: 18/691,157

(22) PCT Filed: Sep. 8, 2022

(86) PCT No.: PCT/EP2022/074998

§ 371 (c)(1),
(2) Date: Mar. 12, 2024

(87) PCT Pub. No.: WO2023/046497

PCT Pub. Date: Mar. 30, 2023

(65) Prior Publication Data

US 2024/0400446 A1 Dec. 5, 2024

(30) Foreign Application Priority Data

Sep. 23, 2021 (EP) .................................... 21198584

(51) Int. Cl.

| | |
|---|---|
| ***C04B 7/26*** | (2006.01) |
| ***C04B 7/12*** | (2006.01) |
| ***C04B 7/47*** | (2006.01) |
| ***C04B 7/52*** | (2006.01) |
| ***C04B 28/02*** | (2006.01) |
| *C04B 111/00* | (2006.01) |

(52) U.S. Cl.

CPC .................. *C04B 7/26* (2013.01); *C04B 7/12* (2013.01); *C04B 7/47* (2013.01); *C04B 7/52* (2013.01); *C04B 28/021* (2013.01); *C04B 2111/00215* (2013.01)

(58) Field of Classification Search

CPC .... C04B 7/26; C04B 7/12; C04B 7/47; C04B 7/52; C04B 28/021; C04B 2111/00215; C04B 28/025; C04B 28/04; C04B 28/06; C04B 28/065; C04B 2103/0088; Y02P 40/10

See application file for complete search history.

(56) References Cited

U.S. PATENT DOCUMENTS

| | | | | |
|---|---|---|---|---|
| 5,626,665 | A | 5/1997 | Barger et al. | |
| 2012/0055376 | A1* | 3/2012 | Herfort | C04B 7/367 106/718 |
| 2016/0031758 | A1* | 2/2016 | Fried | C04B 28/02 106/405 |
| 2017/0267586 | A1 | 9/2017 | Bullerjahn et al. | |
| 2019/0144339 | A1* | 5/2019 | Bullerjahn | C04B 7/13 106/695 |
| 2020/0156998 | A1 | 5/2020 | Donovan et al. | |
| 2022/0363601 | A1* | 11/2022 | Martinage | C04B 14/06 |

FOREIGN PATENT DOCUMENTS

| | | | | |
|---|---|---|---|---|
| CN | 104310891 | A | 1/2015 | |
| EP | 2 253 600 | A1 | 11/2010 | |
| EP | 3828151 | A1 * | 6/2021 | C04B 7/13 |
| GB | 837382 | A * | 6/1960 | C04B 18/027 |
| WO | 2016/082936 | A1 | 6/2016 | |
| WO | WO-2021227391 | A1 * | 11/2021 | F23G 7/06 |

OTHER PUBLICATIONS

WO 2021227391_Machine Translation (Year: 2021).*

Office Action Issued in Indonesian Application No. P00202402477 Dated Mar. 17, 2026 (With English Translation).

International Search Report of PCT/EP2022/074998, mailed Nov. 23, 2022.

International Preliminary Report on Patentability of PCT/EP2022/074998, mailed Dec. 19, 2023.

Extended European Search Report dated Mar. 18, 2022 in European Application No. 21198584.1.

* cited by examiner

*Primary Examiner* — Anthony J Green
*Assistant Examiner* — Anastasia A. Kuvayskaya
(74) *Attorney, Agent, or Firm* — Collard & Roe, P.C.

(57) ABSTRACT

A method for manufacturing supplementary cementitious material includes the steps of: providing a starting material containing clay and fly ash or a mixture of fly ash and bottom ash, wherein at least 70 wt.-% of the starting material are clay, fly ash and bottom ash, homogenization of the starting material, thermal treatment of the starting material at a temperature from 700 to 1000° C. to provide a heat treated material, cooling the heat treated material to provide a cooled product, and grinding the cooled product to provide the supplementary cementitious material, and use of the supplementary cementitious material obtainable through the method for manufacturing hydraulic building materials, as well as supplementary cementitious material obtained.

22 Claims, No Drawings

METHOD FOR MANUFACTURING A SUPPLEMENTARY CEMENTITIOUS MATERIAL

CROSS REFERENCE TO RELATED APPLICATIONS

This application is the National Stage of PCT/EP2022/074998 filed on Sep. 8, 2022, which claims priority under 35 U.S.C. § 119 of European Application No. 21198584.1 filed on Sep. 23, 2021, the disclosure of which is incorporated by reference. The international application under PCT article 21(2) was not published in English.

The present invention relates to a method of transforming waste materials into reactive supplementary cementitious materials for use in hydraulic building materials especially in composite cement and concrete.

Cement is one of the most widely used products in construction. The cement industry is struggling with high $CO_2$ emissions related to the production of cement clinker. A major part of the $CO_2$ emissions related to the clinker production originates from the raw materials used, i.e. from limestone. As environmentally friendlier alternatives to limestone do not exist at large enough scale, reduction of the raw material emissions by limestone substitution is not possible. Thus, reducing the requirement of natural resources in manufacturing cement, both mineral raw materials and fuels, has been a target for decades. Exchanging raw materials and fuel with waste and by-products is especially beneficial as is the use of such materials instead of cement clinker, i.e. as supplementary cementitious material (abbreviated SCM herein). The $CO_2$ emissions may be limited by a further optimization of the cement clinker production. However, such development is limited because of the technological barriers.

Unfortunately, reduction of cement and concrete industry environmental footprint by utilization of industrial waste and by-products as SCM for clinker replacement has reached global availability limits of useful materials (fly ashes and granulated blast furnace slag). By no means all by-products and waste products are suitable as SCMs. The pozzolanic or latent hydraulic reactivity may not be too low, as otherwise the properties of the construction material created from the cement and SCM will be negatively impacted. The availability of the two most important SCM-fly ashes and blast furnace slags-is expected to decrease with the progressing decarbonation of the electricity sector and increased steel recycling, respectively. As a result, limestone and potentially clays, that need to be calcined, are the only SCMs available in sufficient amounts to meet the increasing cement demands. However, the production of calcined clay, i.e. grinding, drying, calcination, causes significant $CO_2$ emissions as well. Further, calcined clay can only be used as an SCM if it has a high mineralogical purity; ideally consists of only one clay mineral. The aluminium oxide content and the $Al_2O_3/SiO_2$ ratio should be high. Moreover, activation by calcination requires staying within a narrow temperature window as well as the shortest possible calcination times (down to seconds). Because clay is highly absorptive and very fine, a large volume of water reducing agent is needed for concrete made out of cement and such an SCM in order to compensate for the increased water demand. Admixtures can be ad- and absorbed on the surface and in the clay interlayers, respectively, which makes it necessary to use larger amounts.

Fly ashes are well known and described materials in cement and/or concrete standards, e.g. EN 197-1, EN 450-1, ASTM C618, and as such they are commonly used. The fly ashes can be siliceous or calcareous depending on origin and classified according to their reactive calcium oxide content. Nevertheless, there are also big amounts of fly ash that are not suitable as SCM due to physical and/or chemical properties, e.g. high water demand and/or not sufficient reactivity expressed as activity index. This is often encountered with calcareous fly ashes.

Another material that cannot be used as an SCM is bottom ash. Bottom ash is part of the non-combustible residue of combustion, e.g. in a power plant, boiler, furnace or incinerator. For example in coal combustion it comprises traces of combustibles embedded in solid deposits formed and sticking to hot side walls of a coal-burning furnace during its operation. The residues fall by themselves into the bottom hopper of e.g. a coal-burning furnace and are cooled. Typically, bottom ash contains combustibles and/or has a high surface causing a high water demand. Therefore, it is not suitable as SCM in cement and concrete.

In the past fly ash and/or bottom ash were often mixed after they left e.g. a boiler, furnace or incinerator in power plant and transported by hydro-transport to a landfill site. Such material is characterized by a high humidity, high content of combustibles and/or has a high surface causing a high water demand. In addition, it may contain impurities introduced during transport to landfill and/or during landfilling, type and amounts of impurities are landfill specific. Therefore, big amounts of such material are available, but are not suitable as SCM in cement and concrete. The mix of bottom ash and fly ash from landfill cannot by easily transformed to useful SCM by simple drying, washing and/or separation due to technical and/or economic reasons.

Another material which may be used as SCM is calcined clay. This material is already described in cement and concrete standards like EN 197-1 or ASTM C618. However, to obtain good quality SCM a high-grade raw clay should be used as starting material for calcination. High-quality clays consisting of a few or only one phase are rare in actual practice and therefore too expensive because of the competition with other industry branches. However, with mixtures of clay phases it is difficult to set an optimum calcination temperature, or to put it another way, the different optimum temperatures for different constituents make it impossible to activate the entire starting material. If the temperature is too low, insufficient volumes will be activated. At somewhat higher temperatures, only those phases that react at these lower temperatures will be activated, which in most cases is still too low a fraction. Although a sufficient fraction will generally be activated at medium temperatures, some fractions of the starting material will have already formed crystalline and therefore inert phases. Although (nearly) all fractions of the starting material will be activated at high temperatures, most fractions will have already formed inert crystalline phases. The various clay minerals have the following optimum calcination temperatures:

Serpentinite 400-500° C.,
Palygorskite 600-800° C.,
Kaolinite 600-800° C.,
Halloysite 600-800° C.,
Pyrophyllite 750-950° C.,
Montmorillonite 800-950° C.,
Illite 800-1000° C.,
Mica 650-1000° C.

Non-converted phases have an especially high water demand and therefore must be avoided as much as possible. Many starting materials also have too low an $Al_2O_3$ content, but considerable amounts of $SiO_2$ and other constituents such as $Fe_2O_3$, CaO, MgO, $Na_2O$ and $K_2O$. For these reasons, many clays, which may fulfill minimum technical requirements, cannot be used economically and in certain circumstances clay-containing or clay-rich materials therefore have to be dumped.

It has already been proposed to make such clays usable as SCM by treating them hydrothermally or by calcining them mixed with limestone or by combining them with limestone, see e.g. EP 2 253 600 A1 and U.S. Pat. No. 5,626,665. A co-calcination with dolomite as described in WO 2016/082936 A1 widens the possibilities considerably.

However, there is still a need to provide sufficiently reactive SCM, and especially the object remains to transform insufficiently reactive waste and byproducts into useful or at least higher reactive/less water demand SCM.

Surprisingly it has now been found that a high temperature thermal treatment of fly ash, and optionally also bottom ash, with an addition of clay allows the manufacturing of a supplementary cementitious material with appropriate reactivity and acceptable water demand. The material obtained in this way reveals pozzolanic properties, i.e. it reacts with calcium hydroxide (Ca $(OH)_2$) in the presence of water to form CSH phase and/or its hydraulically active ingredients in reaction with water also form CSH phase responsible for the strength and durability properties of hardened cement paste, e.g. in mortars and concretes.

Thus, the mentioned object is solved by a method for manufacturing a supplementary cementitious material with pozzolanic reactivity comprising the steps:

- providing a starting material containing clay and fly ash or clay and a mixture of fly ash and bottom ash, wherein at least 70 wt.-% of the starting material are clay, fly ash and bottom ash,
- homogenization of the starting material
- thermal treatment of the starting material at a temperature ranging from 700 to 1000° C. to provide a heat treated material,
- cooling the heat treated material to provide a cooled product, and
- grinding the cooled product to provide the supplementary cementitious material. The object is also solved by a use of a supplementary cementitious material obtainable through the method for manufacturing hydraulic building materials and by the supplementary cementitious material obtained.

So as to simplify the description the following abbreviations that are usual in the field of cement are used herein: H—$H_2O$, C—CaO, A—$Al_2O_3$, F—$Fe_2O_3$, M—MgO, S—$SiO_2$ and $—$SO_3$. Compounds are mostly named by the pure form, without explicit mentioning of solid solutions, foreign ion substitution and impurities etc. as are usual in technical and industrial materials. As the man skilled in the art knows, the exact composition of the phases described may vary due to substitution with foreign ions. Such compounds are comprised when mentioning the pure form herein unless it is expressly stated otherwise.

The term "reactive" shall mean a hydraulic or pozzolanic reactivity unless specified otherwise. Hydraulic reactivity designates the reaction of a compound with water or other water containing compounds to form hydrated phases including a reaction of two or more compounds occurring simultaneously. Pozzolanic reactivity designates the reaction of a compound with water or other water containing compounds in the presence of calcium ions to form hydrated phases from silicon and/or aluminium ions released by the pozzolan with the calcium ions.

Herein, clinker designates a sinter product obtained by burning a raw material at elevated temperature and containing at least one hydraulic phase.

Burning means a change of one or more property of the starting material such as chemistry, crystallinity, phase composition, spatial arrangement and bonds of lattice atoms which is brought about by a supply of thermal energy. The starting material may be a single material, but usually it is a mixture. The starting material is typically finely ground and then designated as raw meal. The starting material may contain mineralizers, which are substances decreasing the temperature necessary for melting and/or act as fluxes and/or enhance clinker formation e.g. by forming solid solutions or stabilization of phases. Mineralizers can be part of the starting material components or be added as separate component.

Cement and hydraulic cement is used to designate a material that, after mixing with water to form a paste, is able to develop mechanical strength by hydraulic reaction. Thus, cement denotes a clinker ground with or without further components, and other mixtures like super sulphated cement, geopolymer cement, and dicalcium silicate cement obtained by hydrothermal treatment and tempering/reactive grinding. A cement is used adding water or another liquid and mostly also aggregate as well as optionally admixtures and/or additives. Cements containing pozzolanic and/or latent hydraulic material and/or mineral filler in addition to the cement are designated composite cements.

A supplementary cementitious material is defined as a pozzolanic and/or latent hydraulic material useful to replace a part of the cement in a composite cement. Latent hydraulic materials have a composition that allows hydraulic reaction upon contact with water, wherein typically an activator is needed to enable hardening within technically feasible times. Activator means a substance that accelerates the hardening of latent hydraulic materials. It can be an addition like sulfate or calcium hydroxide/calcium oxide and/or products of the hydraulic reaction of the ground clinker, e.g. calcium silicates liberate calcium hydroxide during hardening. Pozzolanic materials are characterized by a content of reactive silica and/or alumina which form strength providing calcium silicate hydrates and calcium aluminate hydrates, respectively, during hydration of the cement together with the calcium hydroxides liberated. In practice the limit between latent hydraulic and pozzolanic materials is not well defined, for example fly ashes can be both latent hydraulic and pozzolanic depending on their calcium oxide content. Consequently, the term SCM designates both latent hydraulic as well as pozzolanic materials. However, not reactive or only slightly reactive materials like limestone that substantially do not take part in the hydraulic reactivity have to be clearly differentiated from SCM, with which they are sometimes summarized as mineral additions.

As used herein, the term clay refers to a solid material comprising clay minerals in crystalline, semi-crystalline or amorphous form and mixtures thereof. Generally, clay minerals are hydrous aluminium phyllosilicates that usually contain alkali metal, alkaline earth metal, iron and other cations, often in considerable amounts. They are commonly divided into 1:1 and 2:1 groups such as materials belonging to the kaolin group, or the smectite group, or the vermiculite group, or mixtures thereof. Clays often contain other minerals like quartz and feldspar in addition to the clay minerals.

Bottom ash designates the part of the non-combustible residue of combustion in a power plant, boiler, furnace or incinerator which attaches to the walls and/or falls to the bottom of the combustion device. In an industrial context, it has traditionally referred to coal combustion and comprises traces of combustibles embedded in forming sinter products and sticking to hot side walls of a coal-burning furnace during its operation. The sinter products fall by themselves into the bottom hopper of a coal-burning furnace and are cooled.

Fly ash designates materials collected from exhaust gases, e.g. in waste combustion, coal or gas or oil fired power plants and industrial manufacturing like cement clinker manufacturing. They are typically obtained in filters provided before the stack. Their composition is very variable due to the different fuels and processes. Generally, fly ashes have a high $SiO_2$ content, often also $Al_2O_3$ content. Some fly ashes also contain relevant amounts of CaO, such are designated calcareous fly ashes.

Mix of fly ash and bottom ash is designating a mixture created from separate materials mixed directly before thermal treatment described herein and/or mixtures of fly ash and bottom ash excavated from the landfill.

According to the invention fly ashes and bottom ashes mixed with fly ashes, which were heretofore not useful or less suitable as SCM, are transformed into reactive SCMs by thermal treatment with added clay. The obtained product is characterized by the following properties:

activity index according to EN 450-1:

after 28 days not less than 70%, preferably not less than 75%, after 90 days not less than 85%, preferably not less than 90%, and water demand according to EN 450-1 Annex B not more than 110%, preferably not more than 105%, and preferably also:

loss on ignition according to EN 196-2: not more than 7.0 wt.-%, preferably not more than 5.0 wt.-%, and/or volume stability according to EN 196-3 (also designated soundness) for a cement/binder paste made of 30 wt.-% of the SCM according to the invention and 70 wt.-% of CEM I Portland cement, measured with the expansion value of no more than 10 mm. preferably not more than 5 mm.

The starting material contains clay and either a mixture of fly ash and bottom ash or just a fly ash. The proportions of clay and fly ash or mixture of fly ash and bottom ash depend on their chemical and mineral composition. Typically from 30 to 80 wt.-% fly ash or mixture of fly ash and bottom ash and from 20 to 70 wt.-% of clay with respect to the total starting material weight are suitable. Preferably, at least 35 wt.-% or at least 40 wt.-% or at least 50 wt.-% fly ash or mixture of fly ash and bottom ash and/or at least 30 wt.-% or at least 35 wt.-% clay are used with corresponding upper limits for clay of 65 wt.-% or 60 w.-% or 50 wt.-% and for fly ash or fly ash and bottom ash of 70 wt.-% or 65 wt.-%, respectively. Naturally, the sum of all components in one specific mixture always add up to 100 wt.-%, if further components are present, the maximum content of clay, bottom ash and fly ash is reduced accordingly. However, clay, fly ash and bottom ash make up at least 70 wt.-% of the starting material, preferably at least 80 wt.-%, more preferred at least 90 wt.-%, most preferred 100 wt.-%

A preferred clay contains one or more of the minerals kaolinite, dickite, halloysite, nacrite, montmorillonite, nontronite, beidelite, saponite, illite, palygorskite, and/or sepiolite in crystalline, semi-crystalline and/or amorphous form. Preferred are clays containing kaolinite, montmorillonite, and/or illite in crystalline, semi-crystalline and/or amorphous form. Preferably, the clay contains at least 15 wt.-% clay minerals, more preferred at least 20 wt.-% and most preferred at least 30 wt.-% with respect to the total clay weight. Significant amounts of kaolinite, e.g. at least 10 wt.-% and preferably at least 20 wt.-% with respect to the total clay, are preferred but not necessary. Thermal treatment together with fly ash or fly ash and bottom ash allows the use of clays with low or substantially no kaolinite for making SCM.

Both the fly ash and the mixture of fly ash and bottom ash are typically a waste product from a combustion process such as but not limited to electricity generation from coal, oil or gas; municipal or industrial waste incineration; and manufacturing processes like cement production.

The mixture of fly ash and bottom ash used in one preferred embodiment as part of the starting material is preferably a by-product of coal dust combustion where, after the coal combustion process, all solid residues were mixed with each other. Such materials were previously often deposited in the landfill. This type of material can be used with an addition of clay to produce SCM. Preferred mixtures of fly ash and bottom ash contain at least 25 wt.-% reactive $SiO_2$ with respect to the total weight. The content of main components (sum of $SiO_2$, $Al_2O_3$, $Fe_2O_3$) should be more than 65 wt.-% and most preferred at least 70 wt.-% with respect to the total weight. The total amount of CaO should be below 10 wt.-% and most preferred is less than 5 wt.-% with respect to the total weight. Loss on ignition at 950° C. (abbreviated LOI) typically is below 25 wt.-%, or below 20 wt.-%, or below 15 wt.-%, with respect to the total weight. The amount of $SO_3$ should be below 2.0 wt.-% and most preferred is less than 1.0 wt.-% with respect to the total weight. The amount of $Cl^-$ should be below 0.10 wt.-% and most preferred is less than 0.05 wt.-% with respect to the total weight.

Likewise preferred, fly ash is used as part of the starting material. The fly ash is preferably a calcium rich fly ash. Preferred calcareous fly ashes contain a sum of reactive constituents (reactive $SiO_2$ and reactive CaO) of at least 30 wt.-% and most preferred at least 40 wt.-% with respect to the total weight. The amount of CaO should be at least 10 wt.-% and most preferred at least 20 wt.-% with respect to the total weight. The content of other main components (sum of $SiO_2$; $Al_2O_3$; $Fe_2O_3$) should be more than 40 wt.-% and most preferred at least 50 wt.-% with respect to the total weight. Loss on ignition at 950° C. typically is below 15 wt.-%, or below 10 wt.-%, with respect to the total weight. The amount of $SO_3$ should be below 6.0 wt.-% and most preferred is less than 3.0 wt.-% with respect to the total weight. The amount of $Cl^-$ should be below 0.10 wt.-% and most preferred is less than 0.05 wt.-% with respect to the total weight.

The starting material from fly ash or fly ash and bottom ash with clay addition is homogenized in a manner known per se. One preferred homogenization method occurs in forced operation mixers like double shaft mixers. Before this operation, the material should be ground to a size below 1 mm by using e.g. a rolling crusher, if it is coarser. In another preferred embodiment a starting material powder is subjected to a granulation process e.g. in a screw press to form bigger particles like granules or billets which at the same time homogenizes the starting material. In case one or more components do not have the desired particle size distribution the mixing can also occur in the grinding device.

Next, the starting material is subjected to a high temperature thermal treatment at temperatures from 700 to 1000° C., preferably from 800 to 1000° C., most preferred from 800 to 900° C. Usually, the material is fired in a rotary kiln, shaft kiln, microwave oven, flash calciner or any other device, which is able to achieve and maintain a sufficiently high temperature for the thermal treatment of the starting material. The residence time should be adjusted in such a way that the clay minerals contained in the starting material are dehydroxylated and partially sintered. This results in an activation of pozzolanic reactivity, sometimes hydraulic reactivity, and a decrease in the water demand of building materials made with the product as SCM.

Fuel residues (part of the loss on ignition) from the fly ash- and if present the bottom ash-which are detrimental for a direct use as SCM are advantageous according to the invention. They constitute additional fuel for the thermal treatment and provide a reducing atmosphere inside the starting material, specifically in granules or billets. Thereby, it is possible to obtain a uniform gray color of the SCM made, because iron compounds do not oxidize or oxidize less. Thus, ashes with higher LOI than mentioned before as typical LOI are useful and even advantageous, as far as the LOI is from combustibles.

The main clay phases activated during thermal treatment at temperatures ranging from 700 to 1000° C. are: kaolinite, montmorillonite, illite, mica and amorphous phases. Those phases loose water, dehydroxylate, and the surface decreases. In the bottom and fly ash combustible components are eliminated and also the surface is reduced.

After the thermal treatment, the obtained heat treated material is cooled. Mostly, the particle size of the obtained cooled product is not fine enough or the particle size distribution is not as desired, so the cooled product is ground and/or classified. Often, the particles in the obtained SCM are not fine enough due to the desired sintering. Grinding takes place in a manner known as such, possibly together with further components of the building material, especially cement clinker. Grinding of the SCM alone can be preferred if a specific particle size distribution is desired.

The obtained SCM according to the invention is characterized by the following properties:

an activity index according to EN 450-1: after 28 days not less than 70%, after 90 days not less than 85%, preferably after 28 days not less than 75%, after 90 days not less than 90%, and a water demand according to EN 450-1 Annex B not more than 110%, preferably not more than 105%, and at least one of a loss on ignition according to EN 196-2: not more than 7.0 wt.-%, preferably not more than 5.0 wt.-%, and/or a volume stability according to EN 196-3 for a cement paste made of 30 wt.-% of the SCM and 70 wt.-% of CEM I Portland cement, measured as an expansion value of no more than 10 mm, preferably not more than 5 mm, and/or a specific surface at least 3000 $cm^2/g$ acc. to Blaine (EN 196-6), preferably from 3000 to 4000 $cm^2/g$.

The SCM according to the invention is mainly useful for making composite cements and other hydraulic building materials, including its addition at the time of mixing with water.

The use of the supplementary cementitious material obtainable through the method according to the invention for manufacturing hydraulic building materials usually comprises mixing it with a cement. The cement is preferably selected from the group of Portland cement, Portland cement clinker, calcium sulfoaluminate cement and belite binders obtained by hydrothermal treatment with subsequent tempering and/or grinding. Especially preferred are Portland cement and Portland cement clinker. In another embodiment the use according to the invention comprises mixing of the SCM with an activator to make a geopolymer binder or with sulfate and an activator to provide a super sulfated cement.

Hydraulic building materials comprising an supplementary cementitious material according to the invention obtainable by providing a starting material containing clay and fly ash or a mixture of fly ash and bottom ash, homogenization of the starting material, thermal treatment of the starting at a temperature range from 700 to 1000° C., cooling, and grinding to provide the SCM are typically composite cements, geopolymer binders, super sulfated cements, and construction chemical compositions like screed, putty, tile adhesive etc.

Typical amounts of SCM and cement in composite cements range from 6 to 95 wt.-% SCM and from 5 to 94 wt.-% cement, preferably from 6 to 55 wt.-% SCM and from 45 to 94 wt.-% cement, with respect to the total composite cement weight. If the composite cement comprises further components like additional other SCM and/or additives (e.g. fillers, silica fume, fibers, pigments) and/or admixtures the sum of the amount of SCM according to the invention and cement is naturally lower than 100 wt.-%.

Hydraulic building materials are useful for the same applications as analogous materials from Portland cement or other known cements and are used in the same way. For example, concrete and mortar are obtained by mixing with aggregate and water. As is known per se usually also admixtures and/or additives are added, either to the composite cement or during making the paste. Construction chemical compositions typically contain admixtures and additives and often also aggregate when used, so that they are only mixed with water for use. The exact components of such compositions vary widely and are mostly proprietary knowhow of the manufacturer.

The invention will be illustrated further with reference to the examples that follow, without restricting the scope to the specific embodiments described. The invention includes all combinations of described and especially of preferred features that do not exclude each other.

If not otherwise specified any amount in % or parts is by weight and in the case of doubt referring to the total weight of the composition/mixture concerned. A characterization as "approximately", "around" and similar expression in relation to a numerical value means that up to 10% higher and lower values are included, preferably up to 5% higher and lower values, and in any case at least up to 1% higher and lower values, the exact value being the most preferred value or limit.

The term "substantially free" means that a particular material is not purposefully added to a composition, and is only present in trace amounts or as an impurity. As used herein, unless indicated otherwise, the term "free from" means that a composition does not comprise a particular material, i.e. the composition comprises 0 weight percent of such material.

EXAMPLES

Mixtures of fly ash and bottom ash or only fly ash with different clays addition were tested. Quartz sand was used for comparison. The chemical analysis of the materials is presented in table 1 and the mineralogical compositions in table 2.

TABLE 1

| Material | Mix fly ash + bottom ash [wt.-%] | Fly ash [wt.-%] | Clay 1 [wt.-%] | Clay 2 [wt.-%] | Quartz sand [wt.-%] | CEM I 42.5 R* [wt.-%] |
|---|---|---|---|---|---|---|
| LOI 950° C. | 13.35 | 4.05 | 7.08 | 3.55 | 0.76 | 2.45 |
| $SiO_2$ | 48 | 30.08 | 67.73 | 78.76 | 90.39 | 19.79 |
| $Al_2O_3$ | 24.48 | 22.25 | 11.78 | 10 | 4.7 | 4.96 |
| $Fe_2O_3$ | 5.21 | 8.6 | 5.23 | 2.41 | 0.68 | 3.54 |
| CaO | 1.7 | 26.64 | 1.52 | 0.35 | 0.31 | 63.89 |
| MgO | 2.11 | 1.14 | 1.63 | 0.82 | 0.17 | 1.65 |
| $SO_3$ | 0.19 | 5.56 | 0.11 | 0.09 | <0.01 | 2.95 |
| Cl— | 0.013 | 0.015 | 0.006 | 0.004 | 0.009 | 0.036 |
| $Na_2O$ | 0.58 | 0.08 | 0.43 | 0.78 | 0.84 | 0.17 |
| $K_2O$ | 2.84 | 0.13 | 2.59 | 2.08 | 1.88 | 0.66 |
| $TiO_2$ | 0.98 | 0.76 | 1.21 | 0.87 | 0.12 | — |
| MnO | 0.07 | 0.06 | 0.12 | 0.02 | 0.02 | — |
| $P_2O_5$ | 0.34 | 0.26 | 0.1 | 0.05 | 0.03 | — |
| $Cr_2O_3$ | 0.04 | 0.05 | 0.04 | 0.03 | 0.05 | — |
| $ZrO_2$ | 0.02 | 0.03 | 0.08 | 0.1 | 0.01 | — |

*100% Portland cement containing 4.5 wt.-% limestone

TABLE 2

| Material | Mix fly ash + bottom ash [wt.-%] | Fly ash [wt.-%] | Clay 1 [wt.-%] | Clay 2 [wt.-%] | Quartz sand [wt.-%] | CEM I 42.5 R* [wt.-%] |
|---|---|---|---|---|---|---|
| amorphous phase | 79 | 94 | 46 | 74 | 14 | |
| Quartz $SiO_2$ | 8.2 | 0.9 | 39.9 | 21 | 72 | 0.6 |
| Illite $KAl_4Si_2O_{12}$ | — | — | 6.1 | 2.3 | — | — |
| Albite $NaAlSi_3O_8$ | — | — | 1.9 | 2 | 6.5 | — |
| Microcline $KAlSi_3O_8$ | — | — | 6.1 | — | 7.9 | — |
| Orthoclase $KAlSi_3O_8$ | — | — | — | 0.7 | — | — |
| Silimanite $Al_2SiO_5$ | 12.2 | 0.3 | — | — | — | — |
| Mullite $Al_6Si_2O_{13}$ | — | — | — | — | — | — |
| Anhydrite $CaSO_4$ | — | 1.3 | — | — | | 1.1 |
| Gehlenite (melilite) $Ca_2Al_2SiO_7$ | — | 1.8 | — | — | — | — |
| Hematite $Fe_2O_3$ | 0.4 | 0.4 | — | — | — | — |
| Calcite $CaCO_3$ | trace | — | — | — | — | 2.7 |
| CaO | — | 0.7 | — | — | — | 1.5 |
| Alite 3 $CaO•SiO_2$ | — | — | — | — | — | 66 |
| Belite $2CaO•SiO_2$ | — | — | — | — | — | 7.8 |
| 4 $CaO•Al_2O_3•Fe_2O_3$ | — | — | — | — | — | 4.6 |
| 3 $CaO•Al_2O_3$ | — | — | — | — | — | 10.9 |

*100% Portland cement containing 4.5 wt.-% limestone

EXAMPLE 1

Different SCM compositions were prepared from the mixture of fly ash and bottom ash and addition of clay 1. Materials were mixed for 5 minutes in a laboratory mixer acc. to EN 196-1, then dried for 24±4 hours at 105° C., then heated up to 850° C. and fired for 1 hour at 850° C. in a laboratory electric furnace. The obtained SCM was air-cooled to ambient temperature and ground in a ring mill to a specific surface of 3500±500 $cm^2/g$. Water demand was tested according to EN 450-1 as consistency of mortar with 70 wt.-% ordinary Portland Cement (CEM 42,5R) and 30 wt.-% of SCM. The activity index at 28 and 90 days was tested on samples prepared as standard mortar with 70 wt.-% ordinary Portland Cement (CEM I 42,5R) and 30 wt.-% of SCM taking into account a correction of the water content caused by water demand. Test procedure was as described in EN 450-1. The results are presented in table 3.

TABLE 3

| | | | | | | | |
|---|---|---|---|---|---|---|---|
| Binder composition [wt.-%] | | | | | | | |
| CEM I 42.5 R | | | 70 | | | 70 | 100 |
| SCM | | | 30 | | | 30 | 0 |
| SCM composition [wt.-%] | | | | | | | |
| Mixture of fly ash and bottom ash | 100 | 70 | 50 | 30 | 0 | 0 | 0 |
| Clay 1 | 0 | 30 | 50 | 70 | 100 | 0 | 0 |
| Quartz sand | 0 | 0 | 0 | 0 | 0 | 100 | 0 |

TABLE 3-continued

| Results | | | | | | | |
|---|---|---|---|---|---|---|---|
| Fineness acc. Blaine [cm$^2$/g] | 3690 | 3480 | 3210 | 3640 | 3370 | 3230 | 3750 |
| Loss on ignition [wt.-%] | 13.4 | 3.4 | 3.0 | 2.8 | 7.1 | — | — |
| Soundness [mm] | 1.0 | 0.0 | 1.0 | 0.0 | 0.0 | 0.0 | 0.4 |
| Water demand [%]* | 108.0 | 100.0 | 100.0 | 104.4 | 103.6 | 100 | 100 |
| Activity index at 28 days [%]* | 61.2 | 84.9 | 78.4 | 81.4 | 81.9 | 64.1 | 100 |
| Activity index at 90 days [%]* | 74.3 | 94.7 | 90.5 | 87.4 | 85.3 | 65.5 | 100 |

*% with reference to standard mortar with only CEM I 42.5 R

From the results it is apparent that the clay alone had a high water demand, although the activity index was high enough. The mixture of fly ash and bottom ash alone had a too low activity (lower than quartz sand at 28 days) and also a high water demand. But the SCM from thermally treating 50 or 30 wt.-% clay together with 50 or 70% ash mixture had normal water demand and high activity indices at 28 and at 90 days. Thus, it was possible to obtain useful SCM from ashes not suitable as such and even obtain an SCM with properties improved over the "pure" calcined clay for the starting materials with 50 and 70 wt.-% ashes.

EXAMPLE 2

Different SCM compositions were prepared from the mixture of fly ash and bottom ash and clay 2. Materials were mixed for 5 minutes in a laboratory mixer acc. to EN 196-1, then dried for 24±4 hours at 105° C., then heated up to 850° C. and fired for 1 hour at 850° C. in a laboratory electric furnace. The obtained SCM was air-cooled to ambient temperature and ground in a ring mill to a specific surface of 3500±500 cm$^2$/g. Water demand was tested according to EN 450-1 as consistency of mortar with 70 wt.-% ordinary Portland Cement (CEM I 42,5R) and 30 wt.-% of SCM. The activity index at 28 and 90 days was tested on samples prepared as standard mortar with 70 wt.-% ordinary Portland Cement (CEM I 42,5R) and 30 wt.-% of SCM taking into account a correction of the water content caused by water demand. Test procedure was as described in EN 450-1. The results are shown in table 4.

TABLE 4

| Binder composition [wt.-%] | | | | | | | |
|---|---|---|---|---|---|---|---|
| CEM I 42.5R | | | 70 | | | 70 | 100 |
| SCM | | | 30 | | | 30 | 0 |
| SCM composition [wt.-%] | | | | | | | |
| Mixture of fly ash and bottom ash | 100 | 70 | 50 | 30 | 0 | 0 | 0 |
| Clay 2 | 0 | 30 | 50 | 70 | 100 | 0 | 0 |
| Quartz sand | 0 | 0 | 0 | 0 | 0 | 100 | 0 |
| Results | | | | | | | |
| Fineness acc. Blaine [cm$^2$/g] | 3690 | 3430 | 3290 | 3370 | 3610 | 3230 | 3750 |
| Loss on ignition [wt.-%] | 13.4 | 3.5 | 3.3 | 3.0 | 3.6 | — | — |
| Soundness [mm] | 1.0 | 0.0 | 1.0 | 1.0 | 0.0 | 0.0 | 0.4 |
| Water demand [%]* | 108.0 | 100 | 101.8 | 108.0 | 104.9 | 100 | 100 |
| Activity index at 28 days [%]* | 61.2 | 83.6 | 83.5 | 74.7 | 84.1 | 64.1 | 100 |
| Activity index at 90 days [%]* | 74.3 | 92.3 | 93.2 | 81.8 | 86.0 | 65.5 | 100 |

*% in reference to standard mortar only with CEM I 42.5 R

From the results it is apparent that the clay alone had a high water demand, even though the activity index was high enough. The mixture of fly ash and bottom ash alone had a too low activity (lower than quartz sand at 28 days) and too high water demand. But the SCM from thermally treating 50 or 30 wt.-% clay together with 50 or 70% ash mixture had normal water demand and high activity indices at 28 and at 90 days. Again, it was possible to obtain useful SCM from ashes not suitable as such and even obtain an SCM with properties improved over the "pure" calcined clay for the starting materials with 50 and 70 wt.-% ashes.

EXAMPLE 3

Different SCM compositions were prepared from fly ash and clay 2. Materials were mixed for 5 minutes in a laboratory mixer acc. to EN 196-1, then dried for 24±4 hours at 105° C., then heated up to 850° C. and fired for 1 hour at 850° C. in a laboratory electric furnace. The obtained SCM was air-cooled to ambient temperature and ground in a ring mill to the specific surface 3500±500 $cm^2/g$.

Water demand was tested according to EN 450-1 as consistency of a mortar with 70 wt.-% ordinary Portland Cement (CEM I 42,5R) and 30 wt.-% of SCM. The activity index at 28 and 90 days was tested on samples prepared as standard mortar with 70 wt.-% ordinary Portland Cement (CEM I 42,5R) and 30 wt.-% of SCM taking into account a correction of the water content caused by water demand. Test procedure was as described in EN 450-1. The results are shown in table 5.

TABLE 5

| Binder composition [wt.-%] | | | | | | | |
|---|---|---|---|---|---|---|---|
| CEM I 42.5 R | | | 70 | | | 70 | 100 |
| SCM | | | 30 | | | 30 | 0 |
| **SCM composition [wt.-%]** | | | | | | | |
| Calcareous fly ash | 100 | 70 | 50 | 30 | 0 | 0 | 0 |
| Clay 2 | 0 | 30 | 50 | 70 | 100 | 0 | 0 |
| Quartz sand | 0 | 0 | 0 | 0 | 0 | 100 | 0 |
| **Results** | | | | | | | |
| Fineness acc. Blaine [$cm^2/g$] | 3710 | 3420 | 3680 | 3550 | 3610 | 3230 | 3750 |
| Loss on ignition [wt.-%] | 4.1 | 2.6 | 2.6 | 2.4 | 3.6 | — | — |
| Soundness [mm] | 1.0 | 0.0 | 0.0 | 0.0 | 0.0 | 0.0 | 0.4 |
| Water demand [%]* | 118.2 | 104.0 | 102.7 | 106.7 | 104.9 | 100 | 100 |
| Activity index at 28 days [%]* | 72.5 | 81.2 | 93.2 | 79.3 | 84.1 | 64.1 | 100 |
| Activity index at 90 days [%]* | 75.6 | 92.3 | 99.8 | 82.8 | 86.0 | 65.5 | 100 |

*% with reference to standard mortar only with CEM I 42.5 R

From the results it is apparent that thermal treatment of the clay alone gives good results on activity index after 28 days but still water demand is rather high and activity index after 90 days did not increase significantly. Similarly, thermal treatment of fly ash alone did not give satisfactory results both in terms of water demand and activity index. The treatment of the mixture containing 50 wt.-% clay and 50 wt.-% fly ash provided a reactive SCM with an acceptable water demand. Thus, it was possible to obtain useful SCM from a fly ash not suitable as such and even obtain an SCM with properties improved over the "pure" calcined clay for the starting materials with 50 and 70 wt.-% fly ash.

From the examples it is clear that a thermal treatment of ashes in mixture with clays provides highly reactive SCM with activity indices well above the required ones. Thereby, ashes which are unsuitable for SCM use as such—also after heating-due to e.g. high water demand, high LOI, low activity index, can be made useful as SCM. The clay component is also often more reactive and/or the water demand reduced as compared to calcination of the clay alone. Further, clays which are difficult or impossible to activate fully by calcination on their own can be used. This saves valuable resources and energy and considerably increases the possible amounts of composite cements.

The invention claimed is:

1. A method for manufacturing a supplementary cementitious material comprising the steps of:

providing a starting material containing fly ash and clay or a mixture of fly ash and bottom ash and clay, wherein at least 70 wt.-% of the starting material are clay, fly ash and bottom ash, wherein the fly ash or the mixture of fly ash and bottom ash has a water demand determined according to EN 450-1 above 105% or an activity index determined according to EN 450-1 on a sample prepared with 70 wt.-% CEM I 42.4; R at 28 days below 70% or at 90 days below 85%, either before or after heat treatment at a temperature ranging from 700 to 1000° C., homogenization of the starting material, thermal treatment of the homogenized starting material at a temperature ranging from 700 to 1000° C. to provide a heat treated material, cooling the heat treated material to provide a cooled product, and grinding the cooled product to provide the supplementary cementitious material.

2. The method according to claim 1, wherein the fly ash and/or the mixture of fly ash and bottom ash is a by-product of coal dust combustion.

3. The method according to claim 1, wherein the fly ash or the mixture of fly ash and bottom ash contains at least 25 wt.-% reactive $SiO_2$, and one or more of:

a sum of $SiO_2$, $Al_2O_3$, and $Fe_2O_3$ of at least 65 wt.-%, less than 10 wt.-% CaO, below 2.0 wt.-% $SO_3$, below 0.10 wt.-% $Cl^-$, a loss on ignition at 950° C. below 20 wt.-%, all with respect to the total weight of the fly ash or the mixture of fly ash and bottom ash.

4. The method according to claim 1, wherein the fly ash or the mixture of fly ash and bottom ash contains sum of reactive $SiO_2$ and reactive CaO of at least 30 wt.-%, and one or more of:

a sum of $SiO_2$, $Al_2O_3$, and $Fe_2O_3$ of more than 40 wt.-%, at least 10 wt.-% CaO, below 6.0 wt.-% $SO_3$, below 0.10 wt.-% $Cl^-$, a loss on ignition at 950° C. below 10 wt.-%, all with respect to the total weight of the fly ash or the mixture of fly ash and bottom ash.

5. The method according to claim 1, wherein the clay contains at least one mineral selected from the group consisting of kaolinite, dickite, halloysite, nacrite, montmorillonite, nontronite, beidelite, saponite, illite, palygorskite, and sepiolite in crystalline, semi-crystalline and/or amorphous form.

6. The method according to claim 5, wherein the clay contains at least 15 wt.-% of one or more of the minerals with respect to the total clay weight.

7. The method according to claim 5, wherein the raw clay contains at least 30 wt.-% of one or more of the minerals with respect to the total clay weight.

8. The method according to claim 1, wherein the starting material comprises at least 40 wt.-%, fly ash or mixture of fly ash and bottom ash and at least 30 wt.-% raw clay.

9. The method according to claim 1, wherein the temperature during thermal treatment ranges from 800 to 900° C.

10. The method according to claim 1, wherein the thermal treatment is carried out until the clay is dehydroxylated and partially sintered providing a heat treated product with a higher pozzolanic activity and a lower water demand than the starting material.

11. The method according to claim 1, wherein the cooled product is ground to a specific surface from 3000 to 6000 $cm^2/g$; according to Blaine.

12. The method according to claim 1, wherein the clay calcined at a temperature ranging from 700 to 1000° C. absent the fly ash or mixture of fly ash and bottom ash has a water demand determined according to EN 450-1 above 105% or an activity index determined according to EN 450-1 on a sample prepared with 70 wt.-% CEM I 42,4 R at 90 days below 90%.

13. The method according to claim 1, wherein the fly ash and/or the mixture of fly ash and bottom ash is a by-product of coal dust combustion and wherein all solid residues from the coal dust combustion are mixed.

14. The method according to claim 1, wherein the fly ash or the mixture of fly ash and bottom ash contains at least 25 wt.-% reactive $SiO_2$, and one or more of:

a sum of $SiO_2$, $Al_2O_3$, and $Fe_2O_3$ of at least 70 wt.-%, less than 5 wt.-% CaO, below 2.0 wt.-% $SO_3$, below 0.10 wt.-% $Cl^-$, a loss on ignition at 950° C. below 15 wt.-%, all with respect to the total weight of the fly ash or the mixture of fly ash and bottom ash.

15. The method according to claim 1, wherein the fly ash or the mixture of fly ash and bottom ash contains sum of reactive $SiO_2$ and reactive CaO of at least 40 wt.-%, and one or more of:

a sum of $SiO_2$, $Al_2O_3$, and $Fe_2O_3$ of more than 60 wt.-%, at least 20 wt.-% CaO, below 3.0 wt.-% $SO_3$, below 0.10 wt.-% $Cl^-$, a loss on ignition at 950° C. below 10 wt.-%, all with respect to the total weight of the fly ash or the mixture of fly ash and bottom ash.

16. The method according to claim 1, wherein the starting material comprises from 50 to 70 wt.-% fly ash or mixture of fly ash and bottom ash, and from 30 to 50 wt. % raw clay.

17. A supplementary cementitious material, having an activity index according to EN 450-1 after 28 days of not less than 70%, and a water demand according to EN 450-1 Annex B of not more than 110%, as well as:

a loss on ignition according to EN 196-2 of not more than 7.0 wt.-%, and/or a volume stability according to EN 196-3 for a paste made from 30 wt. % of the supplementary cementitious material and 70 wt.-% of an ordinary Portland cement, measured with the expansion value, of no more than 10 mm, wherein the supplementary cementitious material is obtained by providing a starting material containing fly ash and raw clay or a mixture of fly ash and bottom ash and raw clay, wherein at least 70 wt.-% of the starting material are clay, fly ash and bottom ash, wherein the fly ash or the mixture of fly ash and bottom ash has a water demand determined according to EN 450-1 above 105% or an activity index determined according to EN 450-1 on a sample prepared with 70 wt.-% CEM I 42,4 R at 28 days below 70% or at 90 days below 85%, either before or after heat treatment at a temperature ranging from 700 to 1000° C., homogenization of the starting material, thermal treatment of the homogenized starting material at a temperature ranging from 700 to 1000° C. to provide a heat treated material cooling the heat treated material to provide a cooled product, and grinding the cooled product to provide the supplementary cementitious material.

18. The supplementary cementitious material according to claim 17, having an activity index according to EN 450-1 after 28 days of not less than 85%, and/or a water demand according to EN 450-1 Annex B of not more than 105%, and/or:

a loss on ignition according to EN 196-2 of not more than 5.0 wt.-%, and/or a volume stability according to EN 196-3 for a paste made from 30 wt. % of the supplementary cementitious material and 70 wt.-% of an ordinary Portland cement, measured with the expansion value, of no more than 5 mm.

19. The supplementary cementitious material according to claim 17, wherein the fly ash or the mixture of fly ash and bottom ash contains at least 25 wt.-% reactive $SiO_2$, and one or more of:

a sum of $SiO_2$, $Al_2O_3$, and $Fe_2O_3$ of at least 70 wt.-%, less than 10 wt.-% CaO, below 2.0 wt.-% $SO_3$, below 0.10 wt.-% $Cl^-$, a loss on ignition at 950° C. below 20 wt.-%, all with respect to the total weight of the fly ash or the mixture of fly ash and bottom ash.

20. The supplementary cementitious material according to claim 17, wherein the fly ash or the mixture of fly ash and bottom ash contains sum of reactive $SiO_2$ and reactive CaO of at least 40 wt.-%, and one or more of:

a sum of $SiO_2$, $Al_2O_3$, and $Fe_2O_3$ of more than 60 wt.-%, at least 20 wt.-% CaO, below 3.0 wt.-% $SO_3$, below 0.10 wt.-% $Cl^-$, a loss on ignition at 950° C. below 10 wt.-%, all with respect to the total weight of the fly ash or the mixture of fly ash and bottom ash.

21. The supplementary cementitious material according to claim 17, wherein the raw clay contains at least 30 wt.-% of minerals selected from the group consisting of kaolinite, montmorillonite, and/or illite, in crystalline, semi-crystalline and/or amorphous form.

22. The supplementary cementitious material according to claim 17, wherein the starting material comprises from 50 to 70 wt.-% fly ash or mixture of fly ash and bottom ash, and from 30 to 50 wt.-% raw clay.

* * * * *